April 8, 1924.  P. T. JACKSON  1,489,351
COOKING APPARATUS
Filed Sept. 26, 1922   2 Sheets-Sheet 1
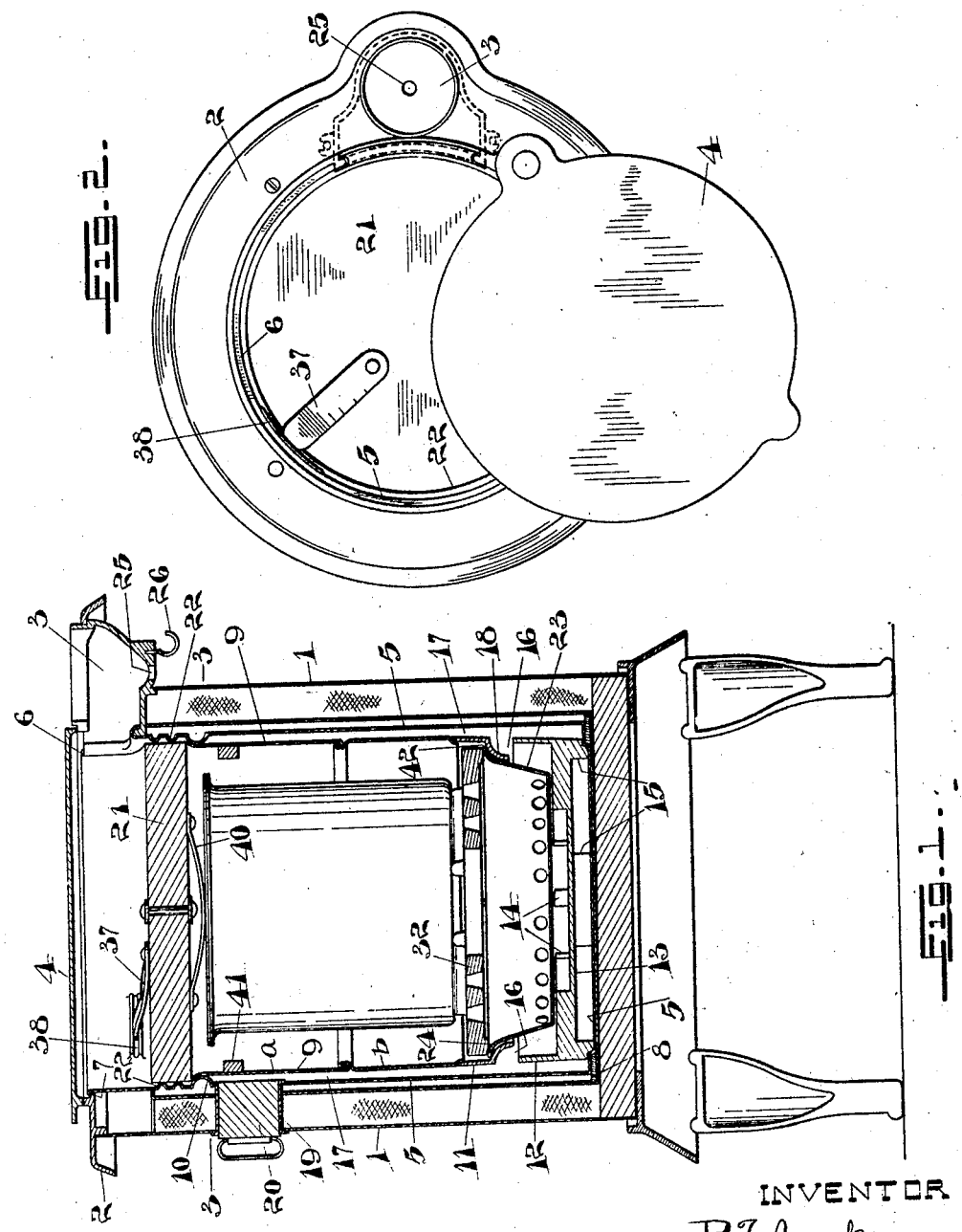

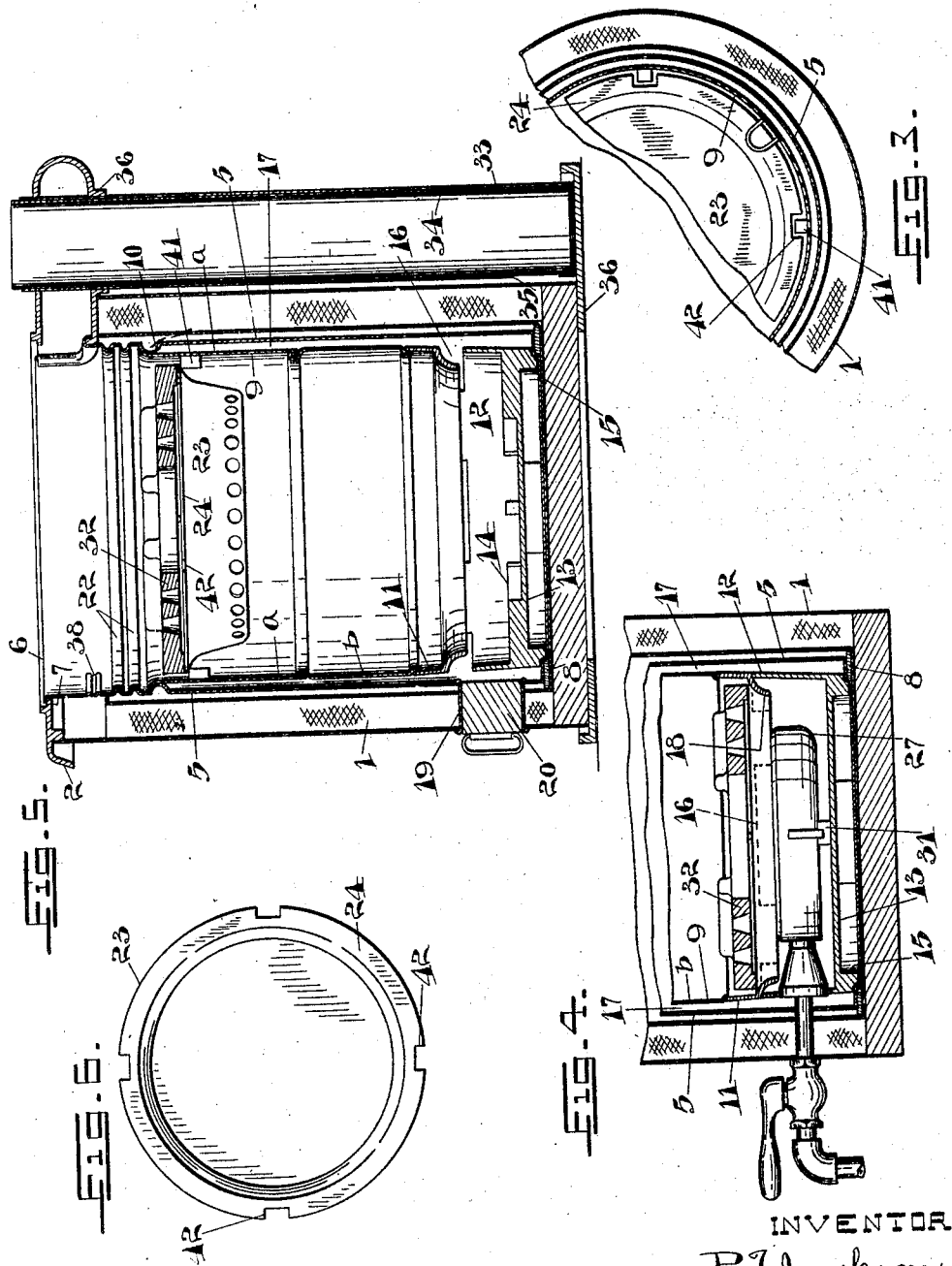

Patented Apr. 8, 1924.

1,489,351

UNITED STATES PATENT OFFICE.

PHILIP T. JACKSON, OF TORONTO, ONTARIO, CANADA.

COOKING APPARATUS.

Application filed September 26, 1922. Serial No. 590,663.

*To all whom it may concern:*

Be it known that I, PHILIP T. JACKSON, of the city of Toronto, in the county of York, Province of Ontario, Canada, a subject of the King of Great Britain, have invented certain new and useful Improvements in Cooking Apparatus, of which the following is a specification.

This invention relates particularly to cooking apparatus of the type shown in my prior United States Patent 1,329,408, issued Feb. 3rd, 1920, which is so designed that the cooking of food may be effected with the use of a minimum of fuel, the cooker being of the retained-heat type in which fuel may be burned to supply the necessary heat, and my object is to improve and simplify the construction and to better adapt it for its intended use.

I attain my object by means of the constructions hereinafter described and illustrated in the accompanying drawings in which—

Fig. 1 is a vertical section of my improved apparatus provided with a fire basket adapted to burn solid fuel;

Fig. 2 a plan view of the same;

Fig. 3 a sectional detail on the line 3—3 in Fig. 1;

Fig. 4 a vertical section of part of the device showing the gas burner in position;

Fig. 5 a side elevation, partly in section, showing the apparatus provided with a telescopic stove pipe and the fuel basket and grid raised to the upper part of the cooking chamber; and Fig. 6 a plan view of the full basket.

In the drawings like numerals of reference indicate corresponding parts in the different figures.

1 is a double wall casing suitably packed with heat insulating material in a manner well known in the construction of retained heat cookers. To the top of the casing is fitted a top 2, which is formed with a lateral smoke flue 3 and a pot hole, which may be closed by a suitable lid 4. It will be noted that the filling of the double wall does not necessarily extend up to the top, the outer wall alone being extended upwardly and suitably fitted to the top.

Inside the double wall casing is fitted an inner casing 5, which is preferably spaced somewhat from the inner wall of the casing, the air space thus formed serving to protect the wall and insulation from the destructive action of heat generated within the cooker. This casing is preferably formed of some material not readily corrodible and is preferably fitted to the top 2, being formed with a lip 6 fitting over the flange 7 surrounding the pot hole. At its lower end the casing is formed with a well bottom, which rests in the metal ring 8 fitted at the bottom of the double wall casing, which serves to distribute the weight of the superincumbent parts. An opening is necessarily formed in the side of this inner casing opposite the smoke flue 3. This casing is easily removed when it is desired to renew it.

Within the inner casing is fitted a tube 9 which forms the wall of the cooking chamber and fire chamber. As the characteristics of this tube are required to be different at different parts of its length, it is preferably made in two or more parts. The upper part $a$ may be formed of aluminum or other suitable metal of comparatively light gauge. This part $a$ of the tube at its upper end is outwardly flared to fit over a bead 10 formed in the inner casing 5. This bead serves to space the tube from the inner casing sufficiently to form an annular air flue. The intermediate part $b$ of the tube is preferably made of sheet metal such as Liberty metal, which is highly resistant to the effects of heat and the hot products of combustion. The lower part of the tube is formed of a comparatively massive material such as a casting of metal and is preferably formed in parts 11 and 12, these parts forming the fire chamber of the apparatus. The part 12 is formed with a closed bottom 13, which is provided with ribs 14 on its upper surface on which a cooking vessel may rest and thus be held above any ashes or spilt fluids or other material which may drop down to the bottom. When a gas burner is employed instead of a fuel basket, the gas burner will rest on lugs 31 as shown in Fig. 4.

At its under side the part 12 is preferably provided with legs 15, which space it from the bottom of the inner casing 5, and which legs are preferably rabbeted to fit into the well bottom of the casing 5, so that the part 12 is accurately positioned by the ring 8. These legs permit air to circulate under the bottom 13 of the part 12 which prevents the bottom of the inner casing becoming overheated.

The part 11 rests on the part 12, the latter being provided with notches 16 in its upper edge forming openings communicating with the annular flue 17 between the tube 9 and the inner casing 5. An inwardly and downwardly extending skirt 18 forms guards over the openings 16 which prevent the direct radiation of heat through these openings against the inner casing 5. It also prevents the possibility of any ashes or food falling through these openings.

Air is admitted through an air passage 19 formed through the double wall of the casing at any convenient point and extending through to an opening formed in the side of the inner casing. This opening, when required, is closable by means of an heat insulated plug 20.

The cooking chamber is also adapted to be closed by means of an heat insulated plug 21, which is adapted to fit within the upper end of the inner casing and rest on the outwardly turned upper rim of the tube 9, which rests on the bead 10. Beads 22 are formed in the inner casing above the bead 10 and project inwardly. The wall of the plug, engaging only with these beads, the plug is easily inserted and removed, as its greatest diameter may thus be less than the interior diameter of the upper part of the inner casing.

23 is the fuel basket provided with a rim 24 which is adapted to fit over the skirt 18. The fuel basket will preferably hang from the skirt 18, but it may be partly or wholly supported on the ribs 14. Apertures for the entrance of air to support combustion are preferably formed in the sides of the fuel basket. The heavy cast grid 32 rests usually on top of the fuel basket and skirt 18 and supports the cooking vessel. It serves also to store heat to be subsequently utilized when the device is used as a retained heat cooker.

It will be noted that an opening 25 is formed in the underside of the smoke flue for the escape of any condensation. A hook 26 is provided adjacent this opening on which a receptacle may be hung to catch any drip.

The device is used in substantially the same manner as that described in my prior patent hereinbefore referred to. When cooking is being carried on by means of the heat generated by burning fuel, the plugs 20 and 21 are removed and the pot hole closed, the air supplying combustion flowing through the air passage 19, the annular flue 17, the openings 16, thence into and through or over the fuel in the fuel basket, the products of combustion passing up through the cooking chamber formed by the tube 9 and thence to the smoke outlet flue 3. When cooking is to go on by retained heat, the fuel basket is removed and the plugs 20 and 21 placed in position, the heat retained in the parts 11 and 12 and the grid 32, which are of a material of high specific heat, serving with the heat retained by the other parts and by the previously heated food to maintain a cooking temperature. It is sometimes desirable to put the grid 32 on top of the cooking vessel, in which case the vessel is set down on top of the ribs 14. This enables a taller cooking vessel to be employed when the plug 21 is in place.

Where fluid fuels are available, a burner such as the gas burner 27 may be substituted for the fuel basket, suitable openings being provided in the wall of the casing and the side of the part 12 for the passage of the necessary connections.

When broiling is to be effected in my cooker and charcoal is being employed as fuel it is necessary to provide means for supporting the fuel basket in the upper part of the tube 9. For this purpose I secure a plurality of lugs 41 to the tube 9 and form notches 42 in the rim of the fuel basket through which the lugs may pass. By raising the basket above the lugs and slightly turning it, it may be supported on the lugs as required.

To better adapt the cooker for use when travelling by motor vehicle or otherwise I prefer to employ a telescopic stove pipe in connection with the device, and also to provide means for holding the loose parts securely in place. The stove pipe is formed of at least two sections 33 and 34. The outer section 33 is closed at the lower end and has an opening 35 formed in its side. This section is adapted to slide through the top of the cooker and normally lies with its lower end received in a shallow receptacle 36 extending from the side of the casing. When this section 33 is raised, the opening 35 comes into position to take off the hot products of combustion from the cooker, the section 34, when raised, gives sufficient length of pipe for good draft.

To hold the loose parts in place I provide the plug 21 with a bent spring 40 secured to the plug and adapted to engage the lid of the cooking vessel. The plug itself may be held down in any suitable manner. I show it as provided with spring bars 37 pivoted on the plug and each having its end adapted to engage in a recess 38 formed in the inner casing 9.

What I claim as my invention is:

1. In cooking apparatus, the combination of a double walled casing, the interior being open at the top; an inner casing fitted within the first casing and spaced from its inner wall; and a removable tube spaced from the inner casing to form an annular air flue, the space within the said tube forming a cooking chamber and a fire chamber below the cooking chamber, communications being formed between said flue and the fire chamber and through the wall of the casing into said flue.

2. In cooking apparatus, the combination of a double walled casing, the interior of the casing being open at the top; an inner casing removably fitted within the casing and spaced from its inner wall; an inwardly projecting bead adjacent the top of the casing; a removable tube forming the wall of the cooking chamber and fire chamber contacting with said bead and spaced from the inner casing to form an annular air flue, communications being formed between said flue and the fire chamber and through the wall of the casing into said flue; and a plug adapted to fit into the upper end of the inner casing above the bead.

3. In cooking apparatus, the combination of a double walled casing, the interior of the casing being open at the top; an inner casing removably fitted within the casing and spaced from its inner wall; inwardly projecting spacing means adjacent the top of the casing; a tube forming the wall of the cooking chamber and fire chamber contacting with said spacing means and spaced thereby from the inner casing to form an annular air flue, communications being formed between said flue and the fire chamber; an air passage having a wall extending through the walls of the casing and inner casing and communicating with the annular air flue; a plug adapted to close said passage; and a plug adapted to fit into the upper end of the inner casing above the spacing means.

4. In cooking apparatus the combination of an open top casing having spacing means inside adjacent the top; a tube forming the wall of the cooking chamber and fire chamber contacting with said spacing means and spaced from the inner wall of the casing by said spacing means to form an annular air flue, communications being formed between said flue and the fire chamber and from without the casing into said flue; and a plug adapted to fit into the upper end of the inner casing above the spacing means.

5. In cooking apparatus, the combination of an open-top casing having inwardly projecting spacing means inside adjacent the top; a tube forming the wall of the cooking chamber and fire chamber contacting with said spacing means and spaced thereby from the inner wall of the casing to form an annular air flue, communications being formed between said flue and the fire chamber; an air passage having a wall extending through the wall of the casing to the annular flue; a plug adapted to close said passage; and a plug adapted to fit into the upper end of the inner casing above the said spacing means.

6. In cooking apparatus, the combination of a double walled casing, the interior of the casing being open at the top; a top fitted on the casing formed with a lateral smoke flue and a pot hole; an inner casing removably fitted within the casing also fitted to the top so as to be removable through the pot hole, said inner casing having an opening in its wall communicating with the smoke flue.

7. In cooking apparatus, the combination of a double walled casing, the interior of the casing being open at the top; a top fitted on the casing formed with a lateral smoke flue and a pot hole; an inner casing removably fitted within the casing also fitted to the top so as to be removable through the pot hole, said tube having an opening in its wall communicating with the smoke flue; an inwardly projecting bead formed in the inner casing below the level of the top of the double wall of the casing; a tube forming the wall of the cooking chamber and fire chamber contacting with said bead and spaced from the inner casing to form an annular air flue, communications being formed between said flue and the fire chamber and through the wall of the casing into said flue; and a plug adapted to fit into the upper end of the inner casing above the bead.

8. In cooking apparatus, the combination of an open-top casing having inwardly projecting spacing means inside adjacent the top; a removable tube contacting with said spacing means and spaced thereby from the inner wall of the casing to form an annular air flue, communications being formed between said flue and the interior of the tube adjacent the bottom and through the wall of the casing into said flue, the lower part of the tube being massively formed of a material of relatively high specific heat.

9. In cooking apparatus, the combination of an open-top casing having inwardly projecting spacing means inside adjacent the top; a removable tube contacting with said spacing means and spaced thereby from the inner wall of the casing to form an annular air flue, communications being formed between said flue and the interior of the tube adjacent the bottom and through the wall of the casing into said flue, the lower part of the tube being separable from the upper part and massively formed of a material of relatively high specific heat.

10. In cooking apparatus, the combination of an open-top casing; a removable tube closed at the bottom and spaced from the inner wall of the casing to form an air flue, the lower part of the tube being massively formed of a material of relatively high specific heat and having air openings in its wall.

11. In cooking apparatus, the combination of an open-top casing; a removable tube closed at the bottom and spaced from the inner wall of the casing to form an air flue, the lower part of the tube being massively formed of a material of relatively high specific heat and having air openings in its wall; and inside guards preventing direct radiation of heat through said openings.

12. In cooking apparatus, the combination of an open-top casing; a removable tube closed at the bottom and spaced from the inner wall of the casing to form an air flue, the lower part of the tube being massively formed of a material of relatively high specific heat and having air openings in its wall and integral ribs on the inside of the bottom forming a support.

13. In cooking apparatus, the combination of an open-top casing having inwardly projecting spacing means inside adjacent the top; a removable tube contacting with said spacing means and spaced thereby from the inner wall of the casing to form an annular air flue, communications being formed between said flue and the interior of the tube adjacent the bottom and through the wall of the casing into said flue, the lower part of the tube being massively formed of a material of relatively high specific heat, the upper and middle portions of the tube being separable from one another and the said lower part.

14. In cooking apparatus, the combination of an open top casing having a projecting bead inside adjacent the top; a tube forming the wall of the cooking chamber and fire chamber contacting with said bead and spaced thereby from the inner wall of the casing to form an annular air flue, communications being formed between said flue and the fire chamber and into said flue from without the casing; an inwardly projecting bead formed in the casing above the first mentioned bead; and a plug adapted to pass through the upper end of the casing and fit the last mentioned bead to close the tube forming the wall of the cooking chamber.

15. In cooking apparatus, the combination of an open top casing having a projecting bead inside adjacent the top; a tube forming the wall of the cooking chamber and fire chamber contacting with said bead and spaced thereby from the inner wall of the casing to form an annular air flue, communications being formed between said flue and the fire chamber and into said flue from without the casing; an inwardly projecting bead formed in the casing above the first mentioned bead; and a plug adapted to pass through the upper end of the casing and fit the last mentioned bead to close the tube forming the wall of the cooking chamber and to rest on the first mentioned bead.

16. In cooking apparatus, the combination of a casing; a tube forming the wall of the cooking chamber spaced from the inner wall of the casing to form an annular air flue, communications being formed between said flue and the fire chamber and from without the casing into said flue; a fire basket; means for supporting the fire basket in the bottom part of the tube; and lugs secured to the inner side of the tube towards its upper end, the rim of the basket being shaped to pass the lugs in one position and to rest on the lugs when turned to a suitable position.

17. In cooking apparatus, the combination of a double walled casing, the interior of the casing being open at the top; a ring fitted in the bottom of the interior of the casing adjacent its inner wall; and an inner casing of less diameter than the inner wall of the doubled walled casing removably fitted within the casing and provided with a well bottom fitting into said ring, said inner casing being held in spaced relationship with the double walled casing by said ring.

18. In cooking apparatus, the combination of a double walled casing, the interior of the casing being open at the top; a ring fitted in the bottom of the interior of the casing adjacent its inner wall; an inner casing removably fitted within the casing and provided with a well bottom fitting into said ring; inwardly projecting spacing means adjacent the top of the inner casing; a removable tube connecting with said spacing means and spaced thereby from the inner wall of the casing to form an annular air flue, communications being formed between said flue and the interior of the tube adjacent the bottom and through the wall of the casing into said flue, the lower part of the tube being massively formed of a material of relatively high specific heat, the said massive bottom being supported by the well bottom of the inner casing and by the ring aforesaid.

19. In cooking apparatus, a casing provided with an internal fire chamber; a lateral smoke flue at its top; a stove pipe slidable vertically through said flue having a closed lower end and provided with a lateral opening adjacent the said end adapted to be brought into communication with the flue when the pipe is raised.

20. In cooking apparatus, a casing provided with an internal fire chamber; a lateral smoke flue at its top; a stove pipe slidable vertically through said flue having a closed lower end and provided with a lateral opening adjacent the said end adapted to be brought into communication with the flue when the pipe is raised; and a receptacle secured to the casing adapted to receive the lower end of the pipe when the latter is lowered.

Signed at Toronto, Canada, this 18th day of Sept., 1922.

PHILIP T. JACKSON.